Sept. 8, 1936. L. STOLTENBERG 2,053,643
POTATO HARVESTING APPARATUS
Filed Sept. 9, 1933 7 Sheets-Sheet 2

INVENTOR.
LOUIS STOLTENBERG
BY
ATTORNEY.

Sept. 8, 1936.    L. STOLTENBERG    2,053,643
POTATO HARVESTING APPARATUS
Filed Sept. 9, 1933    7 Sheets-Sheet 3

INVENTOR.
LOUIS STOLTENBERG
BY
ATTORNEY.

Sept. 8, 1936. L. STOLTENBERG 2,053,643
POTATO HARVESTING APPARATUS
Filed Sept. 9, 1933 7 Sheets-Sheet 4

INVENTOR.
LOUIS STOLTENBERG
BY
ATTORNEY.

Sept. 8, 1936.  L. STOLTENBERG  2,053,643
POTATO HARVESTING APPARATUS
Filed Sept. 9, 1933   7 Sheets-Sheet 7

INVENTOR.
LOUIS STOLTENBERG
BY A. O. Carrillo
ATTORNEY.

Patented Sept. 8, 1936

2,053,643

UNITED STATES PATENT OFFICE 2,053,643

POTATO HARVESTING APPARATUS

Louis Stoltenberg, Oakland, Calif.

Application September 9, 1933, Serial No. 688,756

5 Claims. (Cl. 55—9)

The present invention relates generally to improvements in potato harvesting machines and has particular reference to an improved machine of the class disclosed in my Patents 1,487,821, 1,747,266, 1,828,261 and 1,953,317.

The principal object of the present invention is to provide a new and improved combined machine of the class described that embodies means for delivering and up-rooting tubers, agitating the same to remove foreign matter therefrom, and finally sorting the dug and cleaned potatoes.

A further object of the invention is the provision of an improved machine of the class designated that is compact, positive in operation and in which the several features thereof function in unison.

A still further object of the invention is the provision of a combined machine of this class that may be drawn through the potato field as a unit by means of a tractor or other prime mover.

Other objects and advantages of the invention will become apparent with reference to the subjoined specification and the accompanying seven sheets of drawings in which:—

Figure 1:
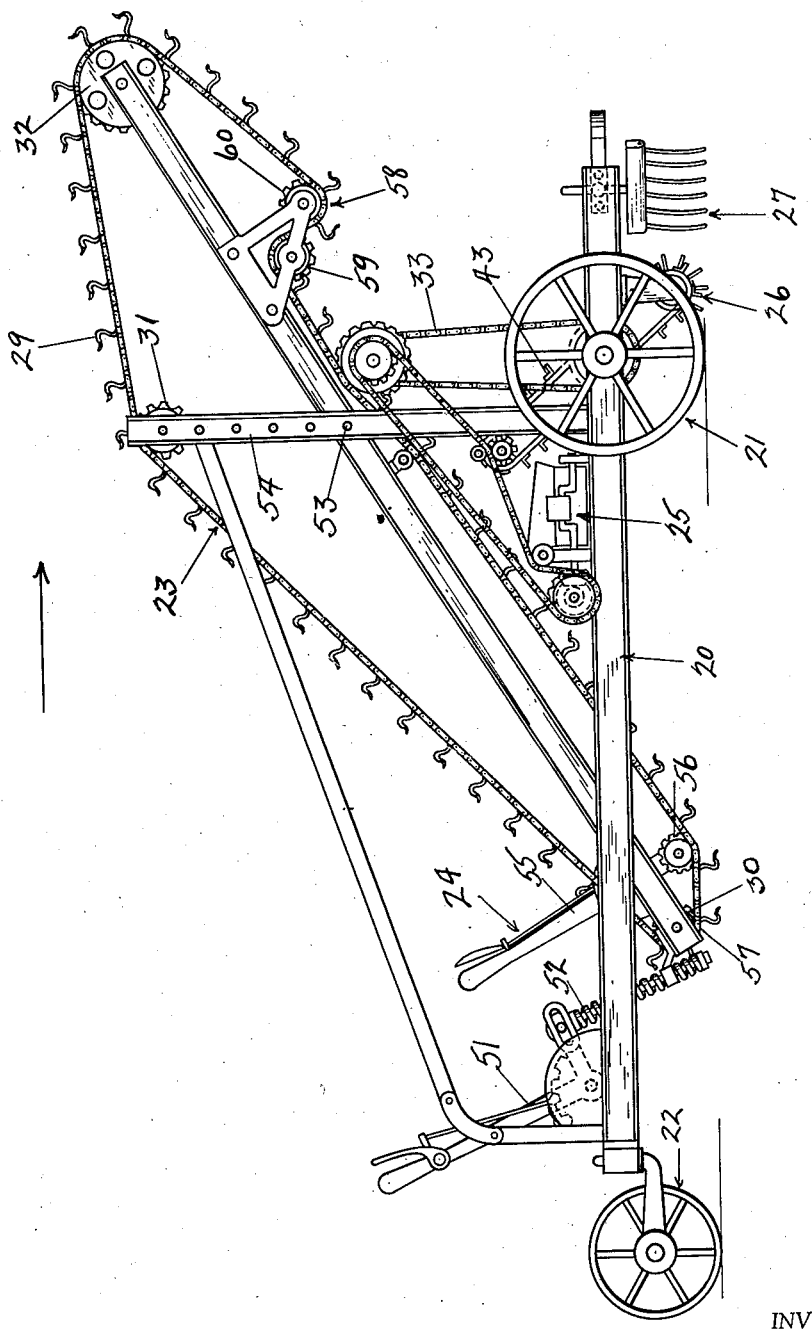
Figure 1 is a side elevation showing the machine and illustrating the main conveyors, picking elements, agitating mechanism, vine separating mechanism and associated co-operating elements.
Figure 2:
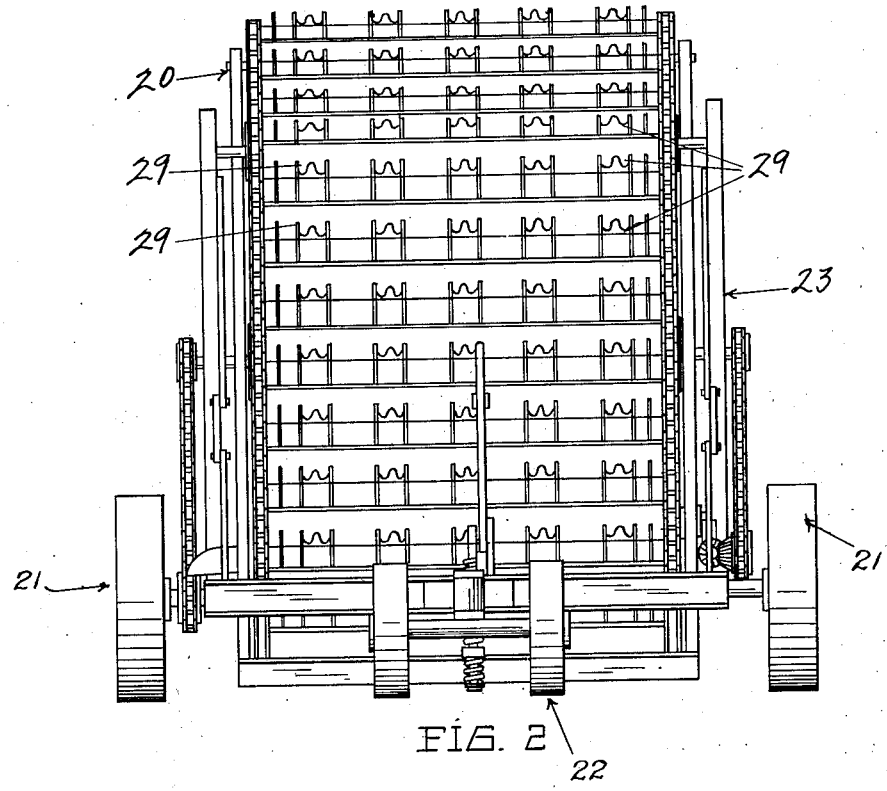
Figure 2 is an enlarged fragmentary rear elevation of the main conveyor mechanism for picking and carrying the potatoes forwardly to the sorting mechanism.
Figure 4:
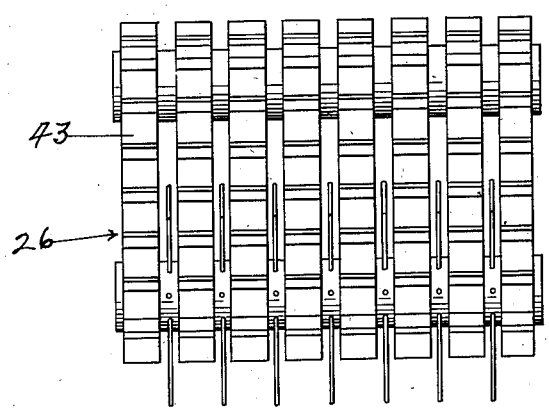
Figure 4 is a front elevation of the same.
Figure 3:
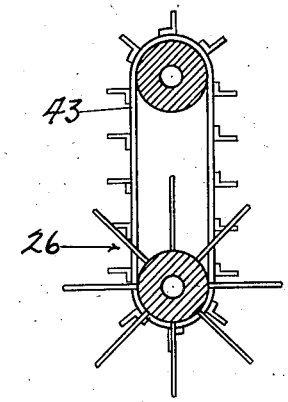
Figure 3 is a sectional detail of the rubbish elevating mechanism.
Figure 12:
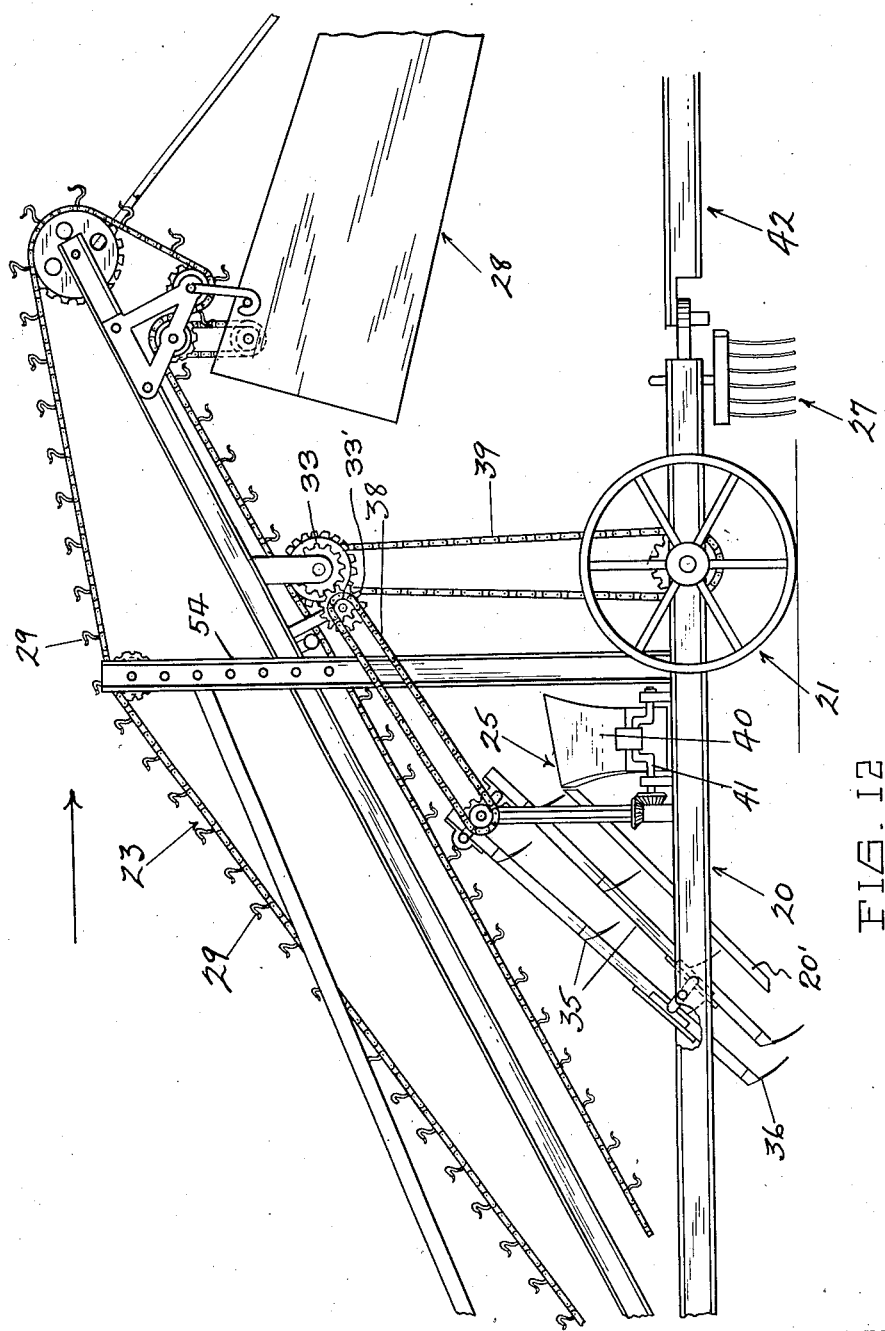
Figure 12 is an enlarged side elevation of the front end of the machine showing the main conveyor and the sorting and sacking mechanism and with oscillating vine diggers.
Figure 13:
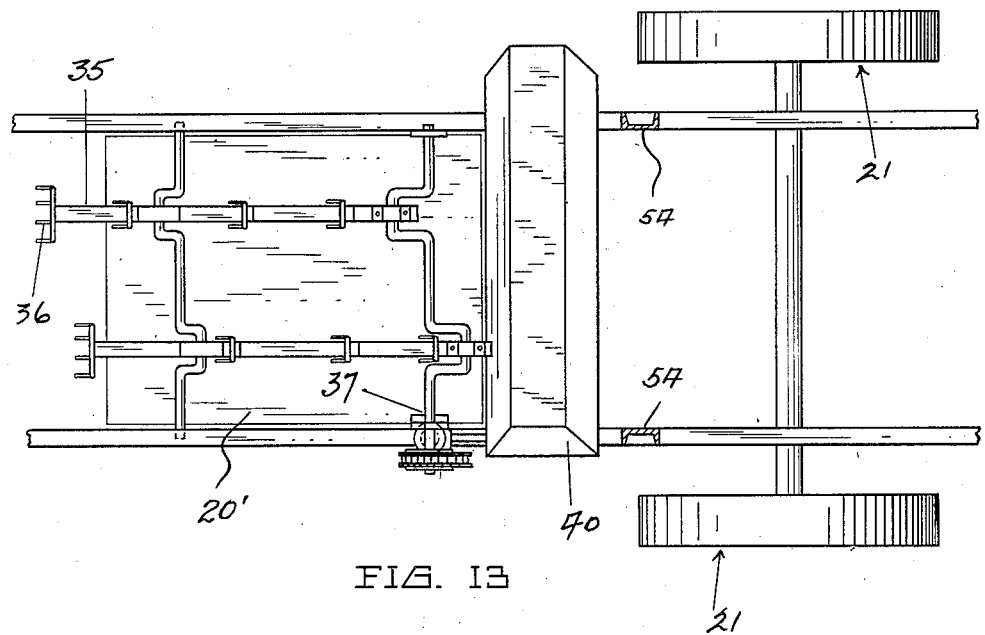
Figure 13 is a plan view of the weed and foreign matter collector and ejecting mechanism.
Figure 14:
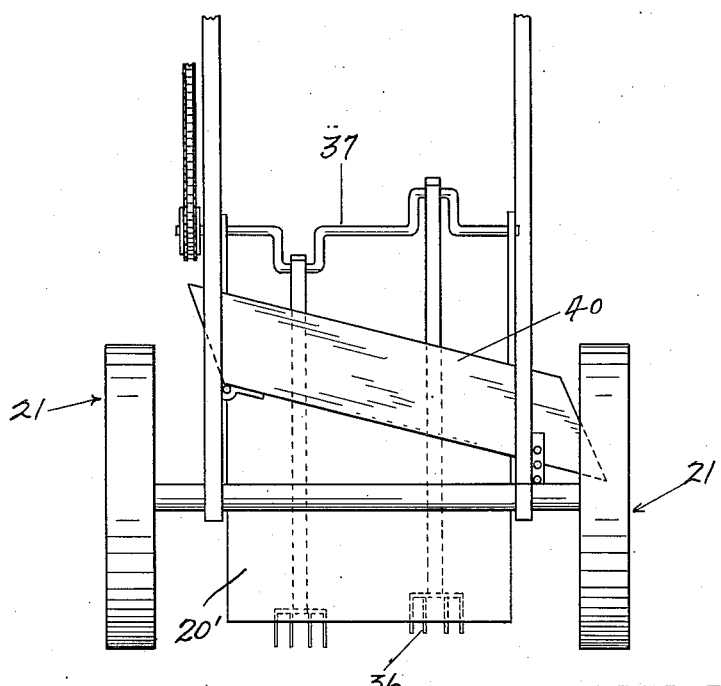
Figure 14 is an elevation illustrating rather diagrammatically the above mechanism.

Referring to the drawings generally and in particular to Figures 1 and 12 the machine comprises generally, the main frame 20, inclined platform 20', traction wheels 21, trailer wheels 22, main conveyor mechanism 23, angle adjusting mechanism 24, rubbish agitating mechanism 25, rubbish elevating mechanism 26, fork mechanism 27, and the sorting and sacking mechanism 28.

The main conveying mechanism 23 embodies a conveyor having a plurality of hooks 29 the chains of which run over a plurality of sprockets 30, 31, 32 and driven from the wheels 21 by means of the chain and sprocket mechanism 33 and a driving sprocket 33'.

Figure 18:
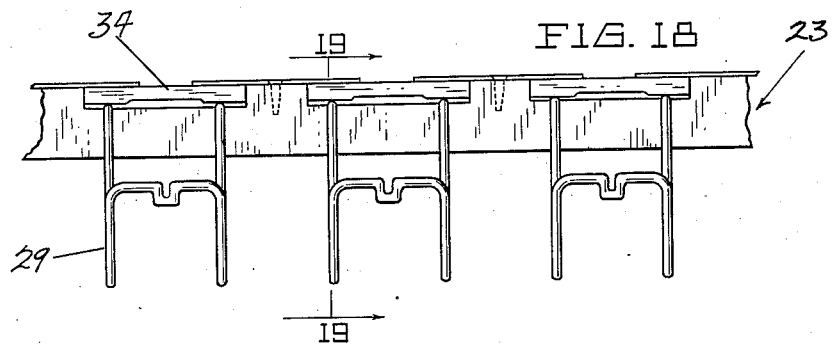
Figure 18 is an enlarged elevation showing the method of mounting the potato gathering hooks on the main conveyor.
Figure 19:
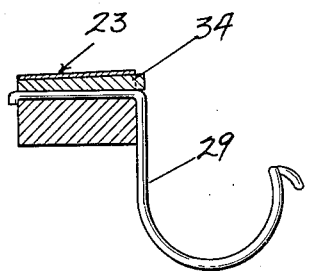
Figure 19 is a sectional detail taken on the line 19—19 of Figure 18.

The hooks 29 are mounted on the conveyor 23 by means of wedging elements 34, Figures 18 and 19, and in Figures 7, 8, 9 and 10 modified hook mountings are shown, on which the hooks are mounted directly on the cross bars of the conveyor 23.

The vine digging and agitating mechanism consists of a plurality of oscillating arms 35 having digging hooks 36 mounted on their ends and intermediate their ends, said digging elements being actuated by means of crank mechanism 37 driven in a counter-clockwise direction by means of sprocket chains 38 and 39 driven by the wheels 21, Figure 12.

An inclined platform is positioned below said mechanism and acts as an apron upon which the dug potatoes, vines and other foreign matter are elevated to the hopper mechanism 40.

Foreign matter, weeds and the like are elevated to the hopper mechanism 40 which is agitated by means of the crank mechanism 41.

The digging arms 35 are oscillated as the machine moves over the ground in the direction of the arrows Figures 1 and 12. The potatoes are dug, and all foreign matter removed therefrom and the main conveyor mechanism and hooks 29, which conveyor mechanism is adjustable relative to the ground by the mechanism 24, carry the potatoes toward and deposit the same in the sacking and sorting mechanism 28.

The machine is drawn over the ground by means of a tractor or the like 42, a portion of which is shown in Figure 12.

Figure 5:
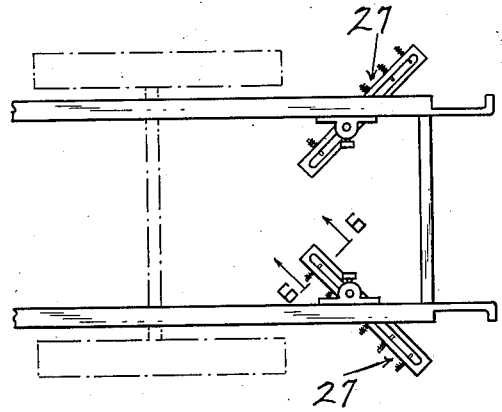
Figure 5 is a plan view of a portion of the machine showing the rubbish and potato vine removing rakes.
Figure 6:
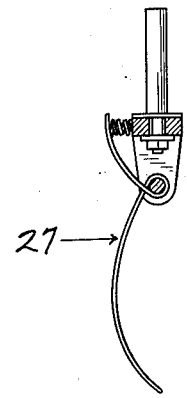
Figure 6 is a sectional detail of the same taken on the line 6—6 of Figure 5.
Figure 7:
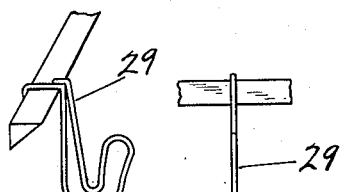
Figures 7, 8, 9 and 10 are perspective views illustrating the potato elevating hooks of the main conveyor.
Figure 8:
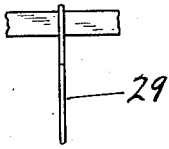
Figure 9:
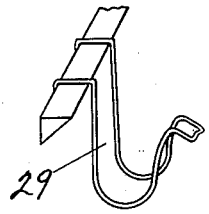
Figure 10:
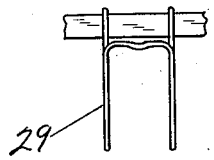

The forks 27 are angularly disposed relative to the line of travel, Figures 5 and 12, and said forks comprise spring elements adapted to clear a patch for the traction wheels 21.

The rubbish elevating conveyor mechanism 26 removes rubbish and the like from the ground by means of a conveyor 43 which rubbish is dropped into the hopper 40 and carried transversely of the machine by the lateral conveyor.

Figure 16:
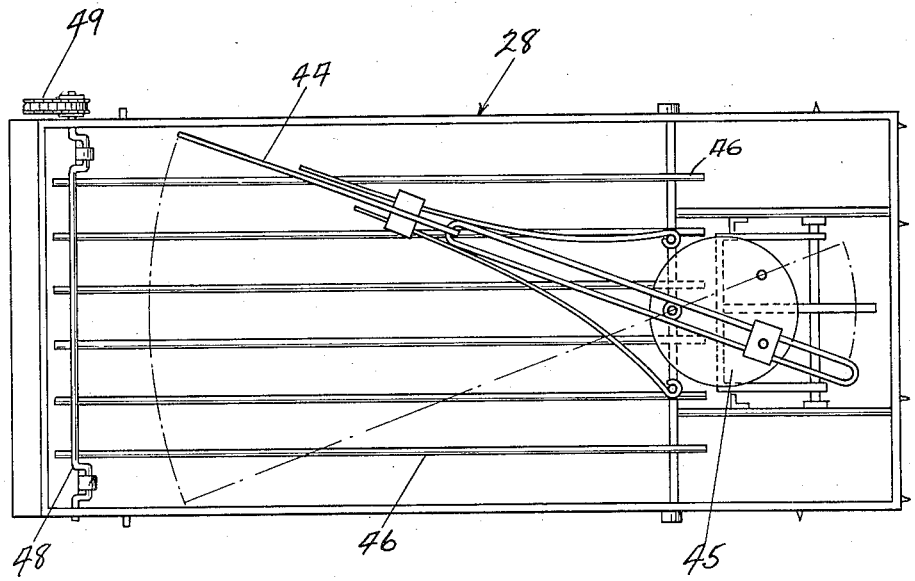
Figure 16 is a plan view of said mechanism.

The deflector mechanism 44 of the sacker and sorter 28 directs the potatoes to one side or the other of the sorter, said mechanism being actuated from one side to the other by the actuating means 45, the wide bars 46 hold the larger potatoes and the bars 47 retain the smaller potatoes and these bars are agitated by the crank mechanism 48 and the sprocket chain 49, Figure 16.

Figure 15:
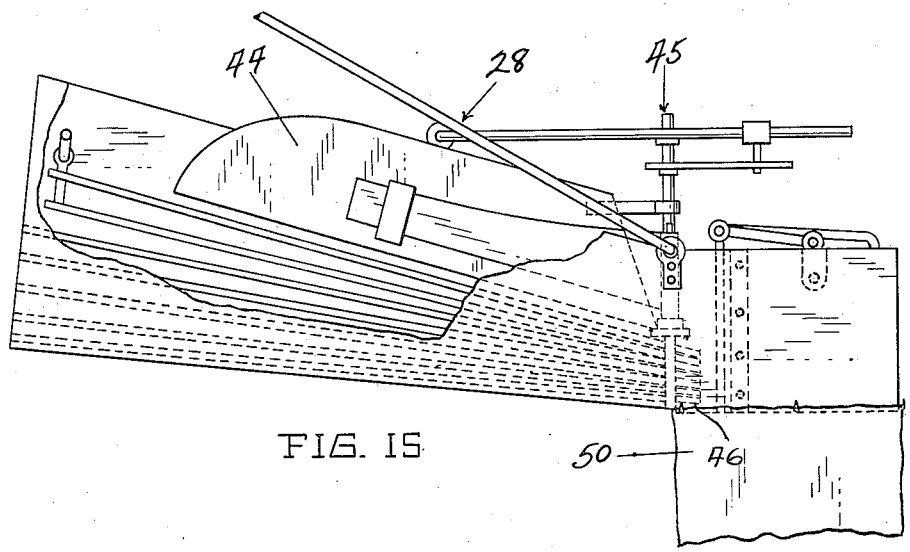
Figure 15 is a side elevation of the sorting and sacking mechanism.
Figure 17:
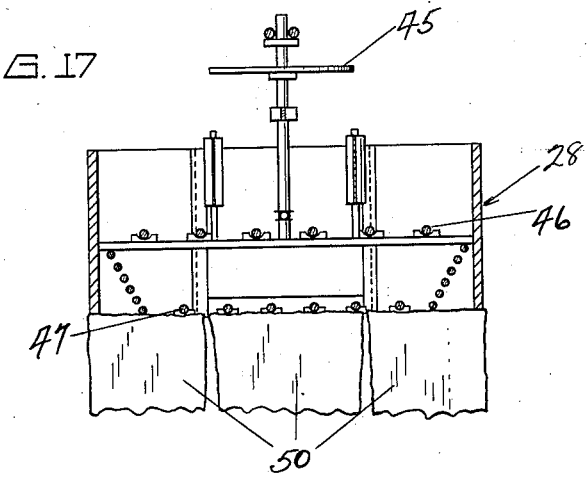
Figure 17 is a transverse section of said mechanism.

The sorted potatoes are dropped into the various sacks 50 as shown in Figures 15 and 17, and the sacks are removed from the sorter as they are filled and deposited, in a truck or like conveyance following the machine, by the operator of the sorting mechanism.

The entire conveyor 23 is adjusted relative to the ground by means of the lever 51 and spring mechanism 52, the entire conveyor being movable about the pivot point 53 mounted in the frame upright 54, the lever 55 and sprocket 56 tending to take up the slack in the conveyor and adjust the lower section 57 thereof relative to the ground so that the hooks 29 will grip the same and carry the tubers forwardly to the sacking and sorting mechanism.

Figure 11:
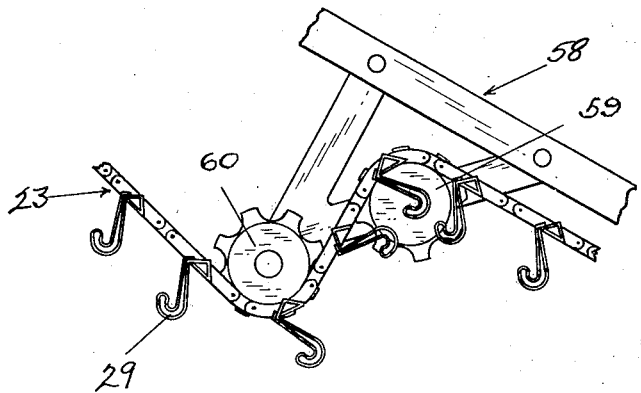
Figure 11 is a detail illustrating the means for actuating the hooks and removing the potatoes by means of agitation.

In Figures 1 and 11 the mechanism 58 tends to invert the hooks 29 by means of inverting sprockets 59 and 60 so that the potatoes will be released at this point. Thus the conveyor 23 is agitated.

In the use of my improved machine it will be obvious that the potatoes are picked, cleaned and finally sorted and the vines removed therefrom and all foreign matter removed which operation is continuous from the digging to the sorting and final sacking operation.

A machine of this character enables large quantities of potatoes to be harvested in one continuous operation and thus greatly reduces the cost of this operation in a minimum period of time.

When both mechanisms 26 and 35 are utilized in the same machine, said mechanisms will deliver material to the hopper 40, the upper right end of said hopper being bevelled or curved to correspond.

Mechanisms 26 and 35 in operation will gather rubbish and vines and deposit them in hopper 40, to be delivered thereby to the side of the machine clear of hooks 29, hooks 29 then dig the tubers themselves and drop them in the sorting mechanisms 28.

I claim and desire to secure by Letters Patent of the United States the following:—

1. In a potato harvesting machine of the class described, in combination, a conveyor and potato gathering mechanism, a potato vine digging mechanism associated therewith, said digging mechanism comprising oscillating members arranged in advance of the conveyor, and means for driving said conveyor and oscillating mechanism in unison.

2. In a potato harvesting machine of the class described, a portable frame, potato vine digging mechanism carried thereby and including oscillating diggers and a potato gathering conveyor operating in conjunction therewith and having potato gathering hooks adapted to gather the potatoes in the rear of said diggers as the machine advances over the ground.

3. In a potato digging machine of the class described, a potato vine digging mechanism, said mechanism embodying a plurality of oscillating arms having forked lower ends, means for oscillating such diggers, and a gathering mechanism associated therewith for gathering the potatoes.

4. In a potato digging machine of the class described, the combination with a portable frame, oscillating rubbish diggers mounted in said frame, potato gathering mechanism co-operating therewith and including a conveyor having spring hooks mounted thereon, said conveyor having means at its lower end to adjust the same relative to the ground, and means for tensioning the lower end of said conveyor.

5. In a potato digging machine of the class described, conveyor means associated therewith, rubbish digging arms oscillatable adjacent to said conveyor, said conveyor having resilient hooks arranged thereon adapted to dig and grip the potatoes, and means for agitating said conveyor.

LOUIS STOLTENBERG.